US009574498B2

(12) United States Patent
Fadde et al.

(10) Patent No.: US 9,574,498 B2
(45) Date of Patent: Feb. 21, 2017

(54) INTERNALLY COOLED TRANSITION DUCT AFT FRAME WITH SERPENTINE COOLING PASSAGE AND CONDUIT

(71) Applicant: General Electric Company, Schenectady, NY (US)

(72) Inventors: Elizabeth Angelyn Fadde, Greenville, SC (US); Patrick Benedict Melton, Horse Shoe, NC (US); David William Cihlar, Greenville, SC (US); Richard Martin DiCintio, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 501 days.

(21) Appl. No.: 14/036,101

(22) Filed: Sep. 25, 2013

(65) Prior Publication Data

US 2015/0082795 A1    Mar. 26, 2015

(51) Int. Cl.

| | | |
|---|---|---|
| *F02C 7/141* | (2006.01) | |
| *F23R 3/60* | (2006.01) | |
| *F23R 3/04* | (2006.01) | |
| *F01D 25/12* | (2006.01) | |
| *F01D 9/02* | (2006.01) | |
| *F23R 3/00* | (2006.01) | |

(52) U.S. Cl.
CPC ............. *F02C 7/141* (2013.01); *F01D 9/023* (2013.01); *F01D 25/12* (2013.01); *F23R 3/002* (2013.01); *F23R 3/04* (2013.01); *F23R 3/60* (2013.01); *F05D 2260/2214* (2013.01); *F23R 2900/03043* (2013.01); *F23R 2900/03044* (2013.01)

(58) Field of Classification Search
CPC .......... F01D 9/023; F01D 25/26; F01D 25/12; F23R 3/002; F23R 3/60; F23R 2900/03043; F23R 2900/03044; F02C 7/141; F05D 2260/2214
USPC ................................................... 60/760, 752
See application file for complete search history.

(56) References Cited

U.S. PATENT DOCUMENTS

| | | | | |
|---|---|---|---|---|
| 4,195,474 A | * | 4/1980 | Bintz | ...................... F01D 9/023 165/169 |
| 5,414,999 A | | 5/1995 | Barnes | |
| 5,906,093 A | * | 5/1999 | Coslow | ................... F23R 3/005 60/39.37 |
| 6,220,036 B1 | * | 4/2001 | Inada | ...................... F01D 9/023 60/752 |
| 6,412,268 B1 | * | 7/2002 | Cromer | ................... F01D 9/023 60/760 |
| 6,553,766 B2 | * | 4/2003 | Shimizu | .................. F01D 9/023 60/752 |

(Continued)

*Primary Examiner* — Gerald L Sung
*Assistant Examiner* — Alain Chau
(74) *Attorney, Agent, or Firm* — Dority & Manning, P.A.

(57) ABSTRACT

An aft frame for a transition duct of a gas turbine combustor includes a main body having an outer rail, an inner rail, a first side rail circumferentially separated from an opposing second side rail, a forward portion, an aft portion and an outer surface. An inlet port extends through the outer surface and an exhaust port extends through the forward portion. A serpentine cooling passage is defined within the main body beneath the outer surface. The serpentine cooling passage is in fluid communication with the inlet port and the exhaust port. A conduit may be connected to the exhaust port for routing a compressed working fluid away from aft frame.

20 Claims, 6 Drawing Sheets

(56) References Cited

U.S. PATENT DOCUMENTS

| | | |
|---|---|---|
| 6,619,915 B1 | 9/2003 | Jorgensen |
| 6,662,567 B1 | 12/2003 | Jorgensen |
| 6,769,257 B2 * | 8/2004 | Kondo .................... F23R 3/60 60/730 |
| 7,178,340 B2 | 2/2007 | Jorgensen |
| 7,178,341 B2 * | 2/2007 | Zborovsky ............. F01D 9/023 60/752 |
| 8,015,818 B2 * | 9/2011 | Wilson ................... F01D 9/023 60/752 |
| 8,186,167 B2 | 5/2012 | Chila et al. |
| 8,245,515 B2 | 8/2012 | Davis, Jr. et al. |
| 8,418,474 B2 | 4/2013 | Rizkalla et al. |
| 2010/0034643 A1 | 2/2010 | Davis, Jr. et al. |
| 2011/0048030 A1 * | 3/2011 | Berry ..................... F01D 9/023 60/806 |
| 2012/0159954 A1 * | 6/2012 | Ito .......................... F01D 9/023 60/752 |
| 2012/0186260 A1 | 7/2012 | DiCintio et al. |
| 2012/0234018 A1 * | 9/2012 | Cihlar .................... F01D 9/023 60/796 |

* cited by examiner

INTERNALLY COOLED TRANSITION DUCT AFT FRAME WITH SERPENTINE COOLING PASSAGE AND CONDUIT

FIELD OF THE INVENTION

The present invention generally involves a combustor of a gas turbine. More specifically, the invention relates to an internally cooled aft frame of a transition duct mounted within the combustor.

BACKGROUND OF THE INVENTION

A turbomachine, such as a gas turbine, generally includes an inlet section, a compressor section, a combustion section that includes a plurality of combustors, a turbine section and an exhaust section. The inlet section cleans and conditions a working fluid (e.g., air) and supplies the working fluid to the compressor section. The compressor section progressively increases the pressure of the working fluid and supplies a high pressure compressed working fluid to a compressor discharge casing that at least partially surrounds each of the combustors.

A fuel is mixed with the high pressure compressed working fluid and the mixture is burned in a combustion chamber that is defined within each combustor to generate combustion gases having a high temperature and pressure. The combustion gases flow along a hot gas path defined within the compressor discharge casing and into the turbine section where they expand to produce work. For example, expansion of the combustion gases in the turbine section may rotate a shaft connected to a generator to produce electricity.

The hot gas path is at least partially defined by an annular combustion liner and/or a transition duct. The transition duct may be provided as part of a transition piece assembly. A conventional transition piece assembly includes an outer impingement sleeve that circumferentially surrounds the annular transition duct. A cooling annulus is defined between the outer impingement sleeve and the transition duct. A downstream end of the transition piece assembly terminates at an inlet port to the turbine.

An aft frame or support member extends generally radially outward and circumferentially around the downstream end of the transition piece assembly. Typically, the aft frame is mounted to a casing, an inner support ring and/or to the turbine so as to provide mounting support for the transition piece assembly and to reduce deformation of the transition duct. During operation, the aft frame is exposed directly to the hot combustion gases. As a result, various cooling schemes have been developed to enhance the thermal and mechanical performance of the aft frame.

One conventional cooling scheme includes routing a portion of the high pressure compressed working fluid from the compressor discharge casing through one or more cooling passages defined within the aft frame and exhausting the high pressure compressed working fluid into the hot gas path and/or into the cooling annulus. The exhausted compressed working fluid may then be used to cool the transition duct and/or the combustion liner. In addition, the compressed working fluid may be routed through the cooling annulus towards the combustion chamber for mixing with the fuel for combustion.

One limitation of conventional cooling schemes is that the shape and/or complexity of the internal cooling passages are limited to single pass or generally linear cooling channels within the aft frame. For example, conventional cooling passages a generally linear inlet port that feeds cooling air to a linearly cooling channel and out of the aft frame through an exhaust port. This linear or single run of the compressed working fluid through the cooling channel restricts the cooling capacity of each cooling channel. In addition, current manufacturing processes require expensive and time consuming secondary operations such as milling or electrical discharge machining to cut the cooling passages and/or the inlet ports and the outlet ports into the aft frame, thus increasing costs of manufacturing.

A second limitation of existing cooling schemes may be prevalent where there is an obstruction such as a fuel injector or other bluff body within the cooling annulus, thus resulting in measurable pressure losses of the high pressure compressed working fluid between the aft frame exhaust ports and the combustion chamber. Another potential limitation of existing cooling schemes may be that the location and orientation of the exhaust ports may not provide optimized cooling beyond the aft frame area. Therefore, an improved internally cooled aft frame for a combustor of a turbomachine, such as a gas turbine, would be useful.

BRIEF DESCRIPTION OF THE INVENTION

Aspects and advantages of the invention are set forth below in the following description, or may be obvious from the description, or may be learned through practice of the invention.

One embodiment of the present invention is an aft frame for a transition duct of a gas turbine combustor. The aft frame includes a main body having an outer rail, an inner rail, a first side rail circumferentially separated from an opposing second side rail, a forward portion, an aft portion and an outer surface. An inlet port extends through the outer surface and an exhaust port extends through the forward portion. A serpentine cooling passage is defined within the main body beneath the outer surface. The serpentine cooling passage is in fluid communication with the inlet port and the exhaust port.

Another embodiment of the present invention is a transition piece assembly. The transition piece assembly includes a transition duct having a upstream end and a downstream end, an outer sleeve that extends circumferentially around the transition duct, a cooling annulus defined between the transition duct and the outer sleeve and an aft frame that is integral with the downstream end of the transition duct and a forward edge of the outer sleeve. The aft frame comprises a main body including an outer rail, an inner rail, a first side rail circumferentially separated from an opposing second side rail, a forward portion, an aft portion and an outer surface. An inlet port extends through the outer surface and an exhaust port extends through the forward portion. The exhaust port is in fluid communication with the cooling annulus. A serpentine cooling passage is defined within the main body of the aft frame and extends beneath the outer surface. The serpentine cooling passage is in fluid communication with the inlet port and the exhaust port.

Another embodiment of the present invention is a gas turbine. The gas turbine includes a compressor at an upstream end of the gas turbine and a combustion section disposed downstream from the compressor. The combustion section includes a combustor and an outer casing that at least partially surrounds the combustor and that is in fluid communication with the compressor. The gas turbine further includes a turbine that is disposed downstream from the combustor. The combustor includes a fuel nozzle and a combustion chamber that is defined downstream from the fuel nozzle. For example, the combustion chamber may be defined by a combustion liner or the like. A transition duct extends downstream from the combustion chamber. The transition duct includes an upstream end that is proximate to the combustion chamber and a downstream end that terminates at an inlet to the turbine. An outer sleeve extends circumferentially around the transition duct to define a cooling annulus therebetween. The combustor further includes an aft frame that is integral with the downstream end of the transition duct and a forward edge of the outer sleeve. The aft frame includes a main body defining a forward portion, an aft portion, an outer surface, an inlet port extending through the outer surface, an exhaust port extending through the forward portion and in fluid communication with the cooling annulus, and a serpentine cooling passage defined within the main body beneath the outer surface. The serpentine cooling passage is in fluid communication with the inlet port and the exhaust port.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
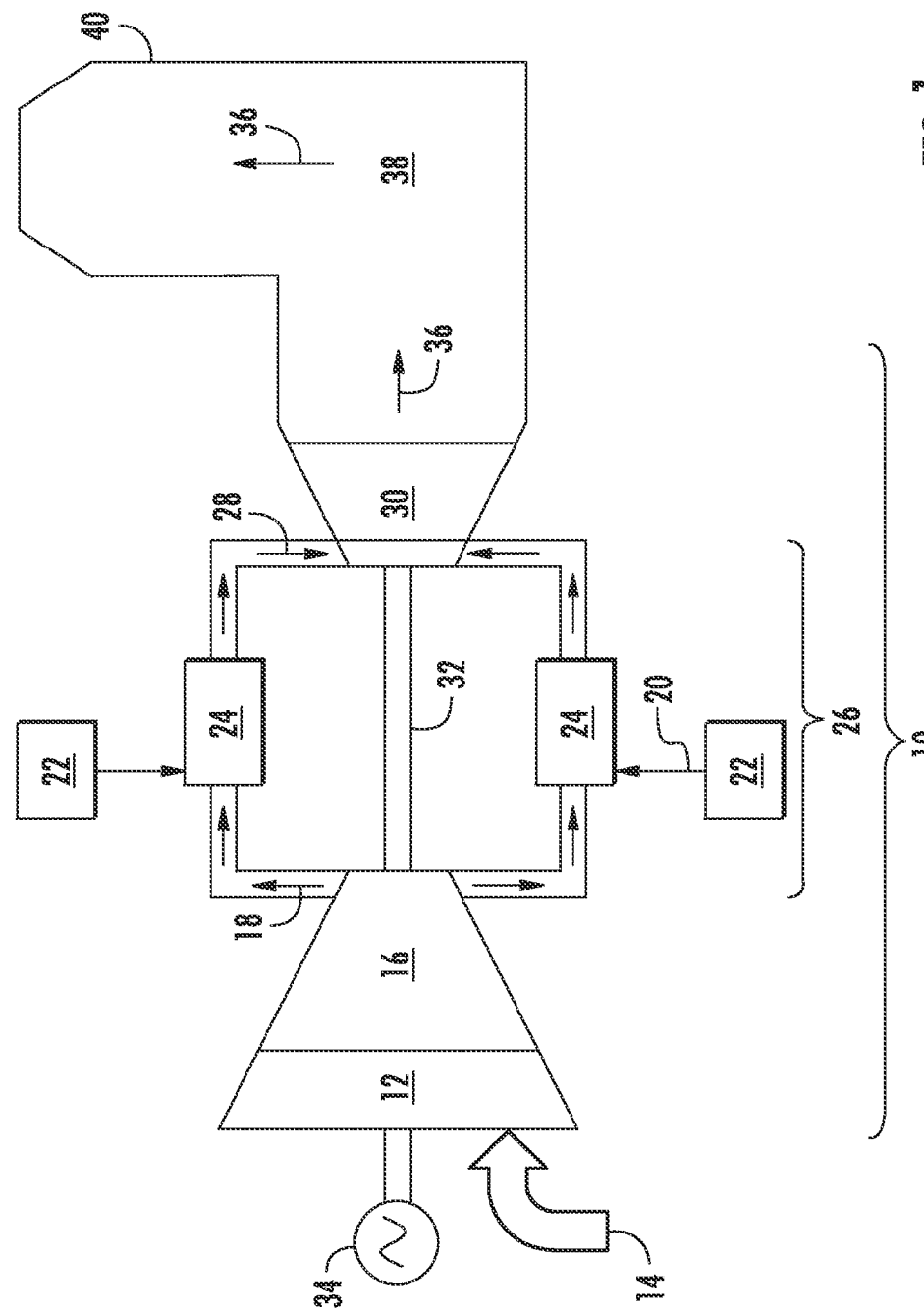
FIG. 1 is a functional block diagram of an exemplary gas turbine within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a combustor incorporated into a gas turbine for purposes of illustration, one of ordinary skill in the art will readily appreciate that embodiments of the present invention may be applied to any combustor incorporated into any turbomachine and are not limited to a gas turbine combustor unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel source 22 such as a fuel skid to form a combustible mixture within one or more combustors 24 of a combustion section 26 of the gas turbine 10. The combustible mixture is burned to produce combustion gases 28 having a high temperature, pressure and velocity. The combustion gases 28 flow through a turbine 30 of a turbine section to produce work. For example, the turbine 30 may be connected to a shaft 32 so that rotation of the turbine 30 drives the compressor 16 to produce the compressed working fluid 18.

Alternately or in addition, the shaft 32 may connect the turbine 30 to a generator 34 for producing electricity. Exhaust gases 36 from the turbine 30 flow through an exhaust section 38 that connects the turbine 30 to an exhaust stack 40 downstream from the turbine 30. The exhaust section 38 may include, for example, a heat recovery steam generator (not shown) for cleaning and extracting additional heat from the exhaust gases 36 prior to release to the environment.

Figure 2:
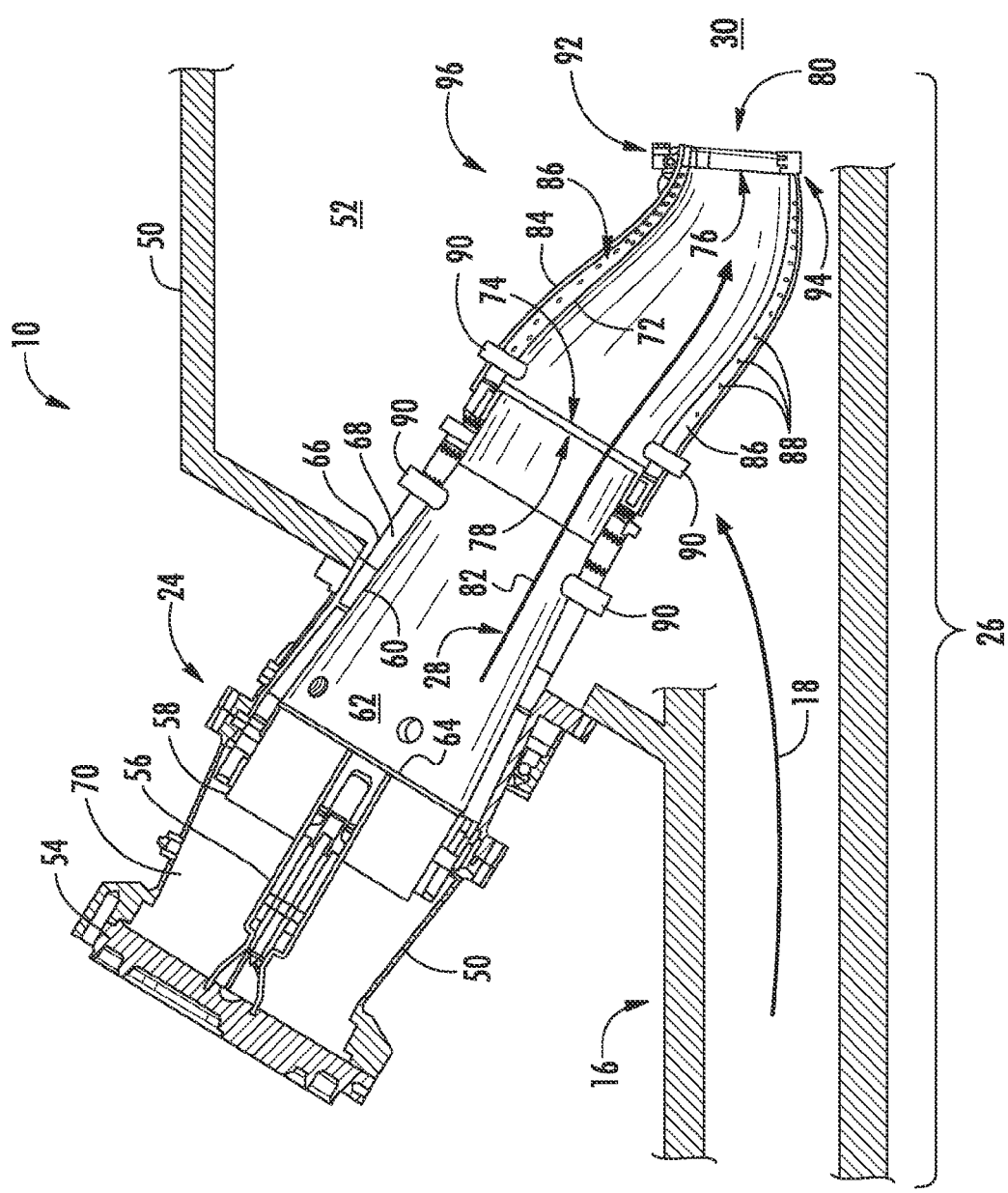
FIG. 2 is a cross sectional side view of a portion of an exemplary gas turbine, including an exemplary combustor that may encompass various embodiments of the present invention.

FIG. 2 provides a cross sectional side view of a portion of the gas turbine 10 including an exemplary combustor 24 as may be incorporated in various embodiments of the present invention. As shown in FIG. 2, the combustion section 26 includes an outer casing 50 such as a compressor discharge casing is disposed downstream from the compressor 16. The outer casing 50 at least partially surrounds the combustor 24. The outer casing 50 at least partially defines a high pressure plenum 52 that at least partially surrounds the combustor 24. The high pressure plenum 52 is in fluid communication with the compressor 16 so as to receive the compressed working fluid 18 from the compressor 16 during operation of the gas turbine 10.

An end cover 54 may be connected to the outer casing 50. In particular combustor designs, the end cover 54 is in fluid communication with the fuel source 22. A fuel nozzle 56 in fluid communication with the end cover 54 and/or the fuel source 22 extends downstream from the end cover 54. The fuel nozzle 56 extends generally axially through an annular cap assembly 58 disposed within the outer casing 50. An annular liner 60 such as a combustion liner or transition duct at least partially defines a combustion chamber 62 within the combustor 24 downstream from an outlet end 64 of the fuel nozzle 56. A flow sleeve 66 may circumferentially surround at least a portion of the liner 60. The flow sleeve 66 is radially separated from the liner 60 so as to define a flow passage 68 therebetween. The flow passage 68 is in fluid communication with the combustion chamber 62 via a head end portion 70 of the combustor 24. The head end portion 70 may be at least partially defined by the end cover 54 and/or the outer casing 50.

A transition duct 72 extends downstream from the combustion chamber 62. The transition duct 72 includes an upstream end 74 that is axially separated from a downstream end 76. In particular configurations, the upstream end 74 surrounds a downstream portion 78 of the annular liner 60. The downstream end 76 of the transition duct 72 terminates proximate to an inlet 80 of the turbine 30. The annular liner 60 and/or the transition duct 72 at least partially define a hot gas path 82 for routing the combustion gases 28 from the combustion chamber 62 through the high pressure plenum 52 and into the turbine 30.

In particular embodiments, an outer sleeve 84 such as an impingement or flow sleeve extends circumferentially around the transition duct 72. The outer sleeve 84 is radially separated from the transition duct 72 to define a cooling annulus 86 therebetween. The outer sleeve 84 may include a plurality of cooling holes 88 or passages that provide for fluid communication between the high pressure plenum 52 and the cooling annulus 86. In one embodiment, the cooling annulus 86 is in fluid communication with the combustion chamber 62. In particular configurations, the cooling annulus 86 is in fluid communication or fluidly linked with the combustion chamber 62 via at least one of the flow passage 68, the head end portion 70 of the combustor 24 and/or the fuel nozzle 56.

In certain combustors, one or more fuel injectors 90, also commonly known as late lean fuel injectors, may extend through the outer sleeve 84, the cooling annulus 86 and the transition duct 72 to provide for fuel injection into the hot gas path 82 downstream from the combustion chamber 62. In addition or in the alternative, the fuel injectors 90 may extend through the flow sleeve 66, the flow passage 68 and the liner 60 to provide for fuel injection into the hot gas path 82 downstream from the combustion chamber 62. In addition or in the alternative, other penetrations such as cross fire tubes, igniters, pressure probes and flame detectors may act as bluff bodies within the flow annulus 86, thus creating disturbances to the flow such as wakes.

Figure 3:
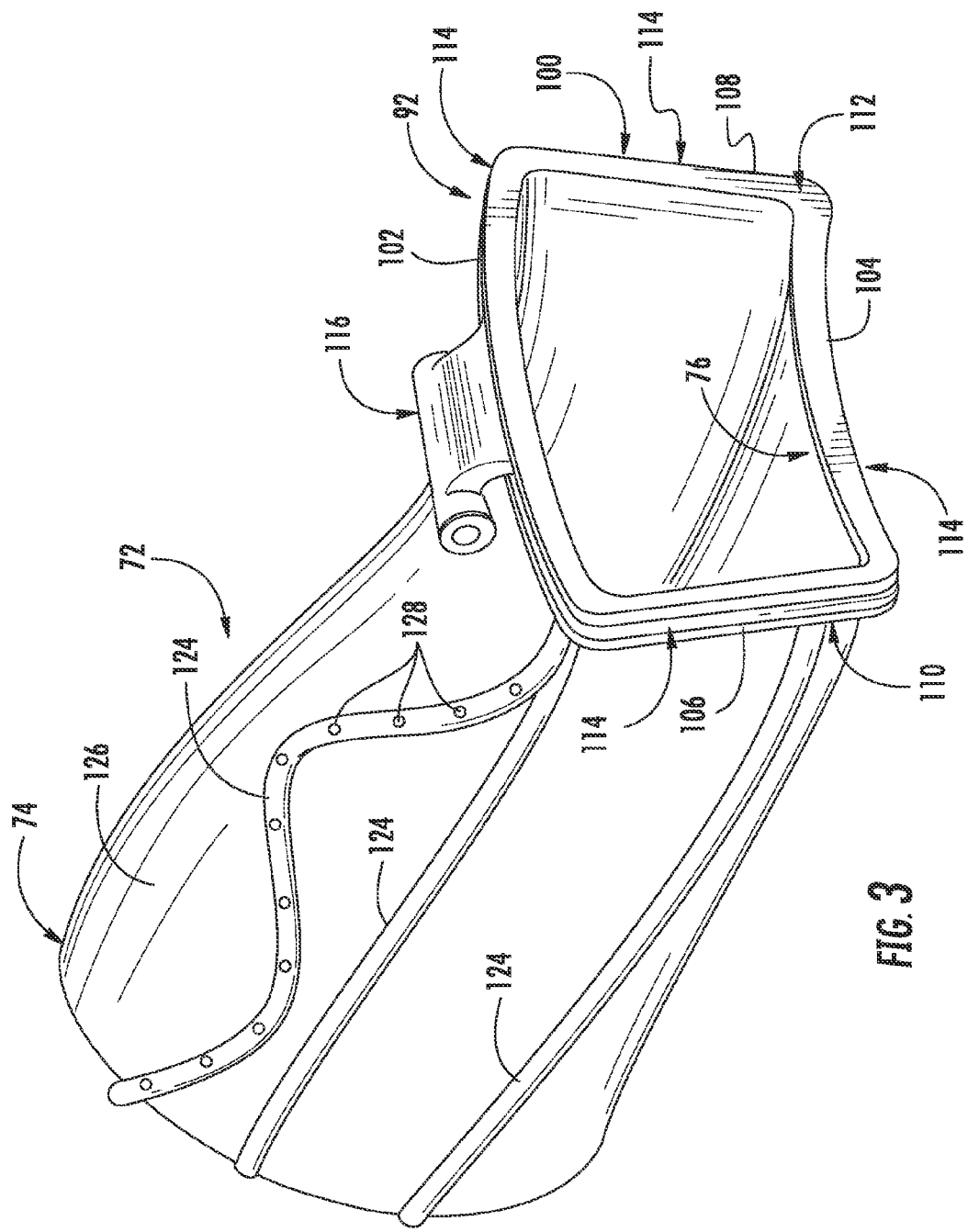
FIG. 3 is a perspective view of an exemplary transition duct and an exemplary aft frame of the combustors as shown in FIG. 2, according to various embodiments of the present invention.

In particular embodiments, an aft frame 92 is disposed at or proximate to the downstream end 76 of the transition duct 72. FIG. 3 illustrates a perspective view of an exemplary transition duct 72 and an exemplary aft frame 92 according to various embodiments of the present invention. As shown in FIGS. 2 and 3, the aft frame 92 is integral with the downstream end 76 of the transition duct 72. As shown in FIG. 2, a portion of the outer sleeve 84 such as a forward edge 94 may be integral or connected to the aft frame 92 to at least partially define the cooling annulus 86.

The aft frame 92 and the transition duct 72 may be manufactured as a singular component. In the alternative, the aft frame 92 may be connected to the transition duct 72 via welding, brazing or any other suitable process. In one embodiment, the transition duct 72, the outer sleeve 84, the cooling annulus 86 and the aft frame 90 are provided as a transition piece assembly 96. The aft frame 92 generally provides structural support to reduce and/or prevent deformation of the downstream end 76 of the transition duct 72 during operation of the combustor. In addition or in the alternative, the aft frame 92 may provide a means for mounting the transition duct 72 within the outer casing 50.

As shown in FIG. 3, the aft frame 92 comprises a main body 100. The main body 100 includes an outer rail 102, an inner rail 104 and a first side rail 106 that is circumferentially separated from an opposing second side rail 108. The main body 100 further includes a forward portion 110 separated from an aft portion 112, and an outer surface or surface 114 that extends around an outer parameter of the main body 100 at least partially between the forward portion 110 and the aft portion 112. The aft frame 92 may also include a mounting feature 116 for the mounting transition duct 72 and/or the transition piece assembly 96 (FIG. 2) within the gas turbine 10.

Figure 4:
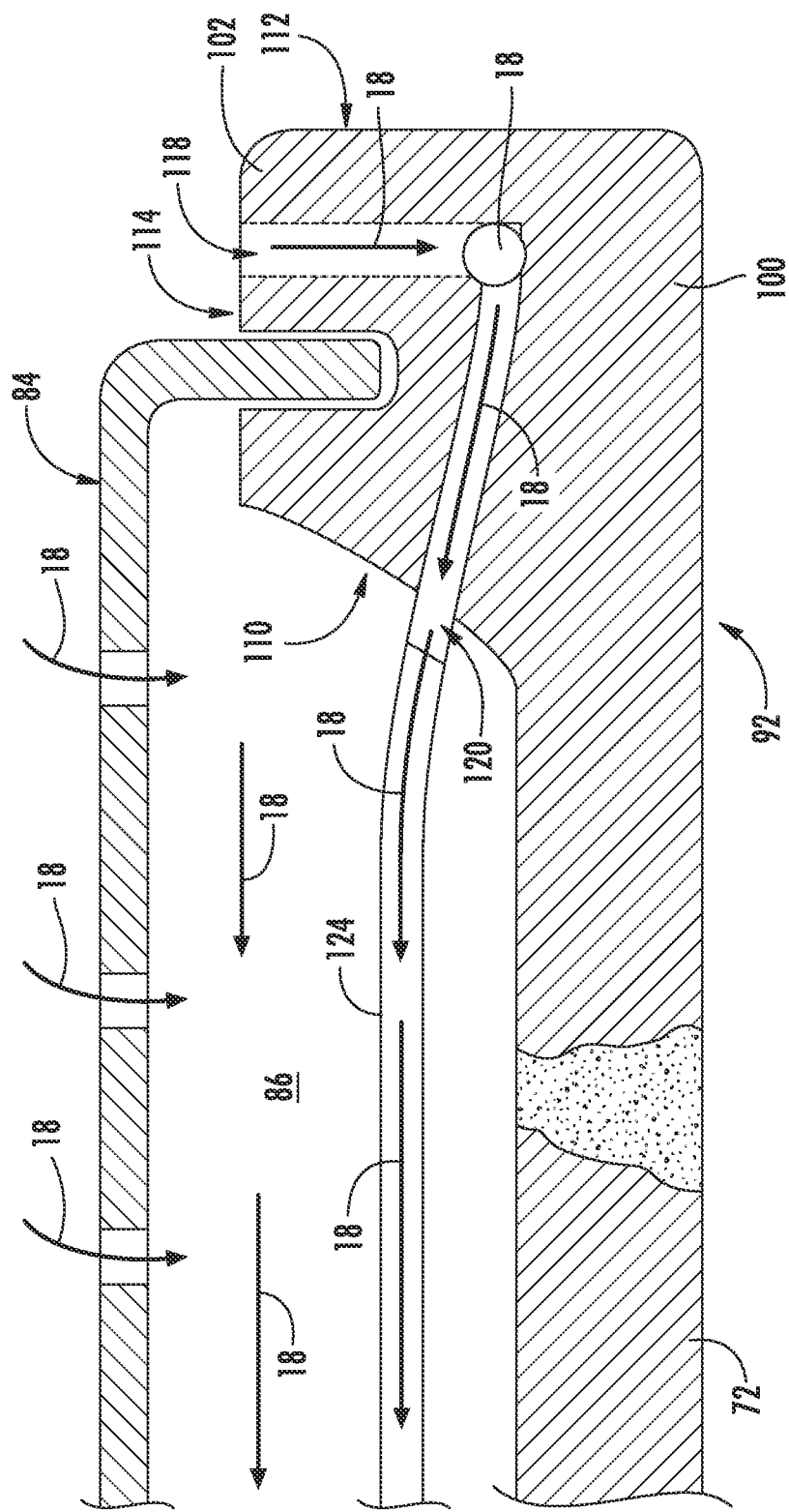
FIG. 4 is a cross sectional side view of a portion of the aft frame taken along section line 4-4 as shown in FIG. 3, according to one embodiment of the present invention.

FIG. 4 provides a cross sectional side view of a portion of the aft frame 92 taken along section line 4-4 as shown in FIG. 3. In various embodiments, the main body 100 defines an inlet port 118 that extends through the outer surface 114 and an exhaust port 120 that extends through the forward portion 110. The inlet port 118 is in fluid communication with the high pressure plenum 52 (FIG. 1). The exhaust port 120 is in fluid communication with the cooling annulus 86.

The inlet port 118 and the exhaust port 120 are shown on a portion of the outer rail 102 for illustrative purposes only. In particular embodiments, the inlet port 118 may be disposed along the outer surface 114 at any of the outer rail 102, the inner rail 104 the first side rail 106 or the second side rail 108. In particular embodiments, the exhaust port 120 may be disposed along the forward portion 110 at any of the outer rail 102, the inner rail 104 the first side rail 106 or the second side rail 108.

Figure 5:
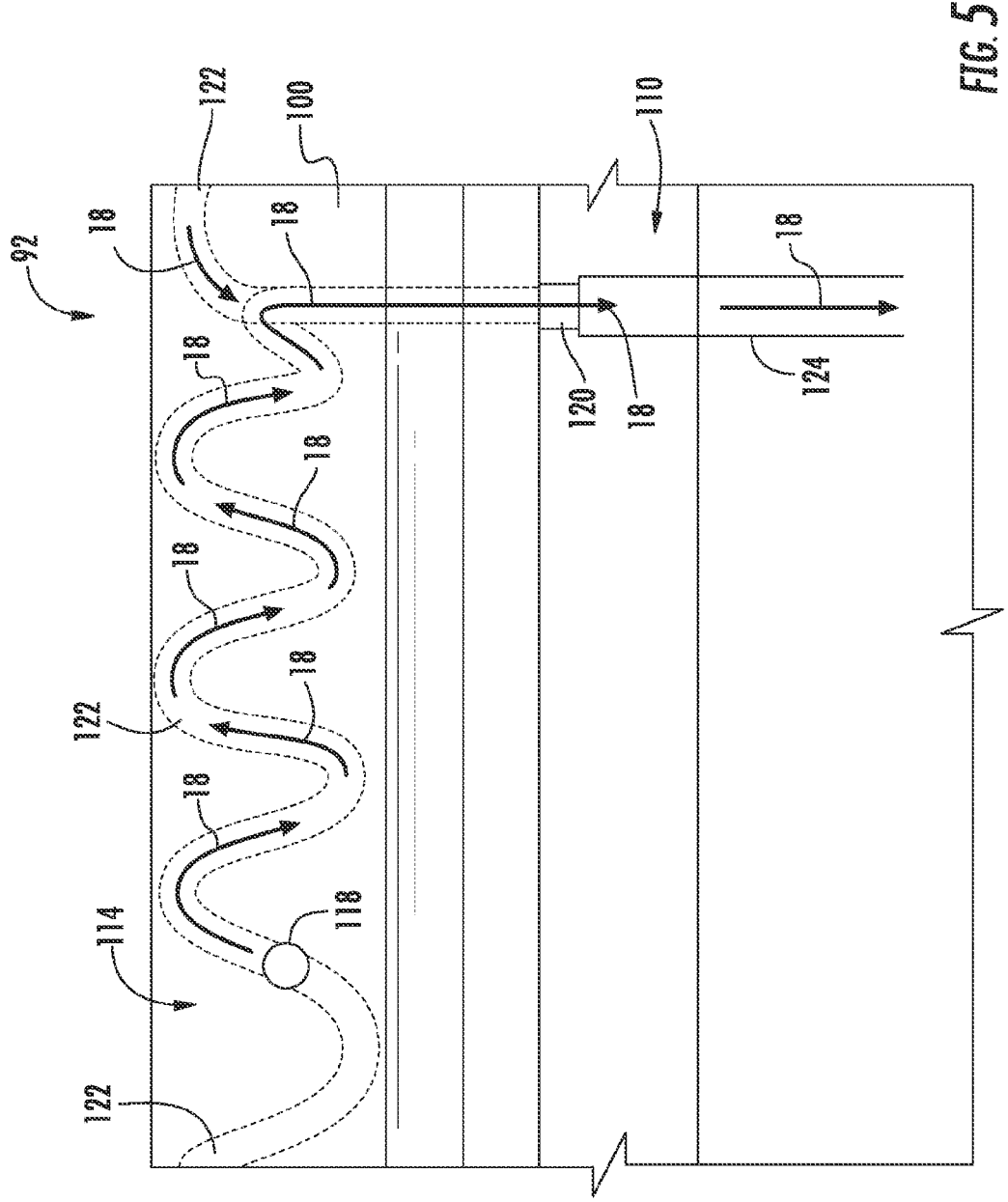
FIG. 5 is a cross sectional overhead view that is representative of any one of an outer rail, an inner rail, a first side rail or a second side rail portion of the aft frame as shown in FIG. 3, according to various embodiments of the present invention.

FIG. 5 provides a cross sectional overhead view that is representative of any one of the outer rail 102, the inner rail 104 the first side rail 106 or the second side rail 108 according to various embodiments of the present invention. In particular embodiments, the main body 100 at least partially defines a serpentine cooling passage 122 that extends beneath the outer surface 114. The serpentine cooling passage 122 is in fluid communication with the inlet port 118 (FIG. 4) and the exhaust port 120 (FIGS. 4 and 5) to provide for fluid communication between the high pressure plenum 52 (FIG. 2) and the cooling annulus 86 (FIGS. 2, 4 and 5).

The serpentine passage 122 may be defined within the main body 100 by various manufacturing processes. For example, the serpentine passages 122 may be cast in to the main body 100 using coring techniques, machined and/or produced by three dimensional (3-D) printing and/or additive manufacturing processes.

In particular embodiments, as shown in FIG. 5, the serpentine cooling passage 122 winds beneath the outer surface 114 between the forward portion 110 and the aft portion 112 two or more times within the main body 100. As shown, the inlet port 118 may feed multiple serpentine passages 122. In addition, the exhaust port 120 may exhaust the compressed working fluid from more than one serpentine passage 122.

In one embodiment, the serpentine cooling 122 passage is at least partially defined in the outer rail 102. In one embodiment, the serpentine cooling passage 122 is at least partially in the inner rail 104. In one embodiment, the serpentine cooling passage 122 is at least partially defined in the first side rail 106. In another embodiment, the serpentine cooling passage 122 is at least partially defined in the second side rail 108.

In particular embodiments, as shown in FIGS. 4 and 5, a conduit 124 is coupled to and in fluid communication with the exhaust port 120 of the aft frame 92. In one embodiment, as shown in FIG. 3, the conduit 124 extends across an outer surface 126 of the transition duct 72 towards the upstream end 74 of the transition duct 72. The conduit 124 extends within the cooling annulus 86 (FIG. 2) between the outer sleeve 84 and the transition duct 72. In particular embodiments, a plurality of conduits 124, each in fluid communication with a corresponding exhaust port 120, may extend across the outer surface 126 of the transition duct 72. The conduit 124 may extend within the cooling annulus 86 towards the flow passage 68 so that the compressed working fluid 18 can be routed past or behind the various bluff bodies.

The fluid conduit 124 may extend generally linearly and/or may be curved. The fluid conduit 124 may include cooling holes 128 to allow a portion of the compressed working fluid 18 to flow out of the conduit 124 at specific locations along the outer surface 126 of the transition duct 72. In particular embodiments, the fluid conduit 124 provides for fluid communication between the exhaust port 120 and one or more of the cooling annulus 86, the flow passage 68, the head end portion 70 of the combustor 24, and/or the combustion chamber 62.

Figure 6:
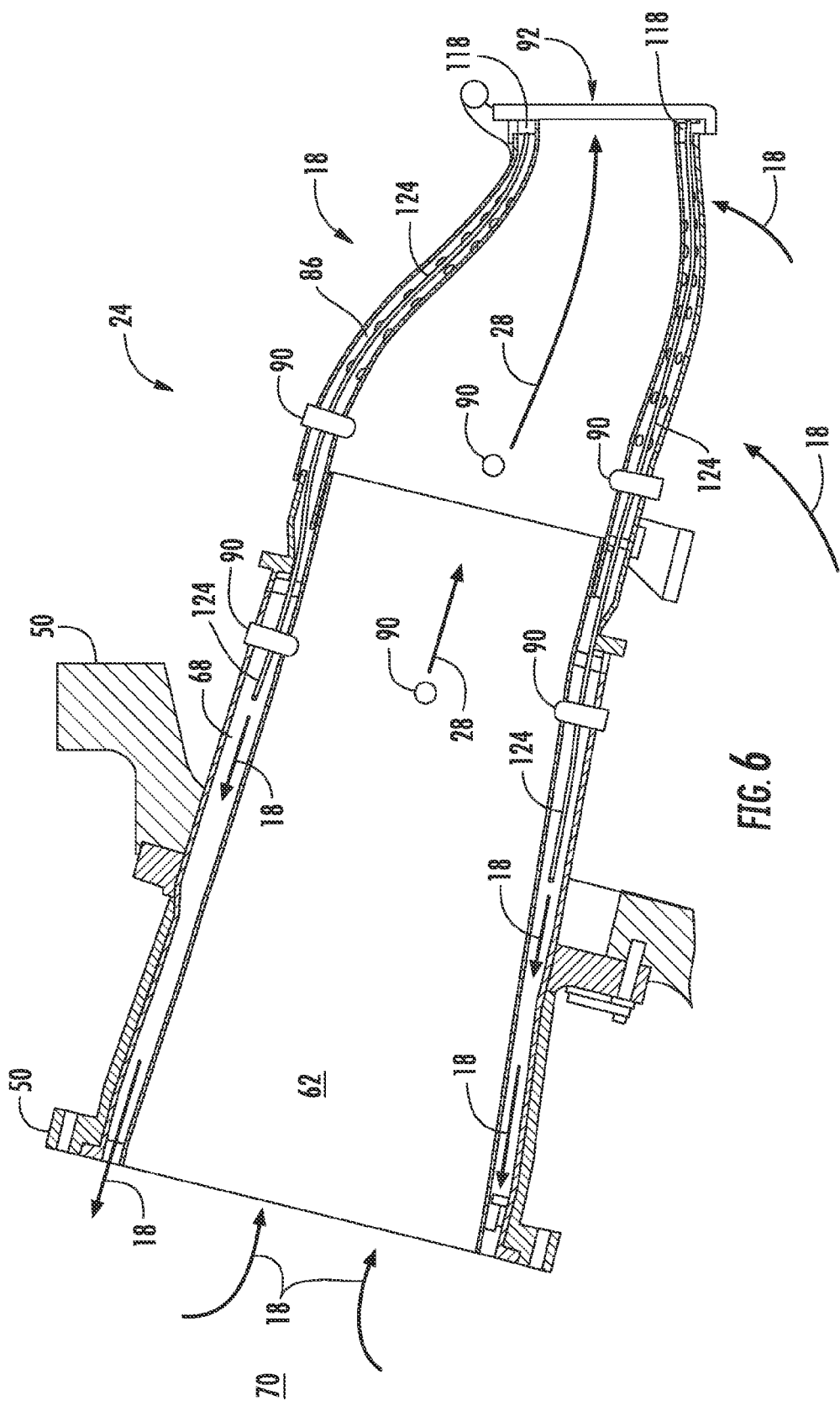
FIG. 6 is a cross sectional side view of a portion of the combustor as shown in FIG. 2, according to one embodiment of the present invention.

FIG. 6 is a cross sectional side view of a portion of the combustor 24 as shown in FIG. 2, according to one embodiment of the present invention. As shown in FIG. 6, the conduit 124 may extend from the aft frame 92 towards the combustion chamber 62 and/or the head end portion 70 of the combustor 24. In particular embodiments, the conduit 124 may extend past the fuel injectors 90 within the cooling annulus 86 and/or the flow passage 68.

In operation, as illustrated in FIGS. 2-6, the compressed working fluid 18 flows from the compressor 16 into the high pressure plenum 52. A portion of the compressed working fluid 18 flows through the cooling holes 88 and into the cooling annulus 86 to provide impingement and/or film cooling to the outer surface 126 of the transition duct 72. The compressed working fluid 18 is then routed towards the combustion chamber 62 via the flow passage 68, thus providing further cooling to the liner 60 before reaching the head end portion 70 of the combustor 24 and reversing direction.

The compressed working fluid 18 is routed through and/or around the fuel nozzle 56 and mixed with the fuel 20. The premixed fuel 20 and compressed working fluid 18 flows into the combustion chamber 62 and is burned to produce the combustion gases 28. The combustion gases 28 flow through the hot gas 82 path defined by the liner 60 and/or the transition duct 72 into the turbine 30.

Another portion of the compressed working fluid 18 flows from the high pressure plenum 52 through the inlet port of the aft frame 92 into the serpentine cooling passage 122. As the compressed working fluid 18 flows or winds between the forward portion 110 and the aft portion 112 of the aft frame 92, thermal energy is transferred to the compressed working 18, thus reducing thermal stresses on the aft frame 92. The winding or torturous path defined by the serpentine cooling passage 122 increases the cooling capacity of the compressed working fluid 18 flowing therethrough when compared to conventional linear and/or stepped cooling passages.

In conventional aft frame cooling schemes, the compressed working fluid 18 is exhausted proximate to the forward portion 110 of the aft frame 92 where it is picked up by the compressed working fluid 18 flowing directly from the high pressure plenum 52 through the cooling holes 88 of the outer or impingement sleeve 84 into the cooling annulus 86. However, the various obstructions within the cooling annulus 86 and/or the flow passage 68 such as the fuel injectors 90, cross fire tubes, igniters, pressure probes and flame detectors result in measurable pressure losses of the compressed working fluid 18 as it communicates from the high pressure plenum 52 to the combustion chamber 62, thus affecting the overall performance of the combustor 24. In addition, these obstructions also disrupt the flow field of the compressed working fluid 18, thus creating hot spots along various portions of the transition duct 72 and/or the combustion liner 60.

In particular embodiments, the compressed working fluid 18 flows from the exhaust passage 120 into the conduit 124 to carry the compressed working fluid 18 downstream from the aft frame 92 within the cooling annulus 86. In one embodiment, the conduit 124 extends past the fuel injectors 90 to reduce pressure losses between the exhaust port 120 and the combustion chamber 62, thereby improving the overall performance of the combustor 24. In other embodiments, the compressed working fluid 18 flows from the exhaust port 120 through the conduit 124 where a portion of the compressed working fluid 18 flows through the cooling holes 128 to provide localized or precision cooling of the outer surface 126 of the transition duct 72 and/or the liner 60. For example, the cooling holes 128 may be positioned adjacent to various hot spots that form along the transition duct and/or the liner 60 due to the various obstructions within the cooling annulus 86 and/or the flow passage, thus reducing thermal stresses on the transition duct 72 and/or the liner 60.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An aft frame and a transition piece including the aft frame, of a gas turbine, the aft frame comprising:
   a. a main body including an outer rail, an inner rail, a first side rail circumferentially separated from an opposing second side rail, a forward portion, an aft portion and an outer surface;
   b. an inlet port;
   c. an exhaust port;
   d. a serpentine cooling passage defined within the main body beneath the outer surface, wherein the serpentine cooling passage is in fluid communication with the inlet port and the exhaust port; and e. a conduit coupled to the exhaust port, wherein the conduit is a tube that extends across an outer surface of the transition piece, and wherein the conduit defines an outlet along the transition piece, and wherein the outlet is upstream relative to the exhaust port relative to a direction of a flow of combustion gases through the transition piece.

2. The aft frame as in claim 1, wherein the serpentine cooling passage winds beneath the outer surface between the forward portion and the aft portion two or more times within the main body.

3. The aft frame as in claim 1, wherein the serpentine cooling passage is at least partially defined in the outer rail.

4. The aft frame as in claim 1, wherein the serpentine cooling passage is at least partially defined in the inner rail.

5. The aft frame as in claim 1, wherein the serpentine cooling passage is at least partially defined in the first side rail.

6. The aft frame as in claim 1, wherein the serpentine codling passage is at least partially defined in the second side rail.

7. A transition piece assembly, comprising:
   a. a transition duct having an upstream end and a downstream end;
   b. an outer sleeve that extends circumferentially around the transition duct;
   c. a cooling annulus defined between the transition duct and the outer sleeve; and
   d. an aft frame integral with the downstream end of the transition duct and a forward edge of the outer sleeve, the aft frame comprising:
      i. a main body including an outer rail, an inner rail, a first side rail circumferentially separated from an opposing second side rail, a forward portion, an aft portion and an outer surface;
      ii. an inlet port;
      iii. an exhaust port in fluid communication with the cooling annulus;
      iv. a serpentine cooling passage defined within the main body beneath the outer surface, wherein the serpentine cooling passage is in fluid communication with a the inlet port and the exhaust port; and
      v. a conduit coupled to the exhaust port, wherein the conduit is a tube that extends across an outer surface of the transition duct, and wherein the conduit defines an outlet along the transition piece, and wherein the outlet is upstream relative to the exhaust port relative to a direction of a flow of combustion gases through the transition piece.

8. The transition piece assembly as in claim 7, wherein the serpentine cooling passage winds beneath the outer surface between the forward portion and the aft portion two or more times within the main body.

9. The transition piece assembly as in claim 7, wherein the serpentine cooling passage is at least partially defined in the outer rail.

10. The transition piece assembly as in claim 7, wherein the serpentine cooling passage is at least partially defined in the inner rail.

11. The transition piece assembly as in claim 7, wherein the serpentine cooling passage is at least partially defined in the first side rail.

12. The transition piece assembly as in claim 7, wherein the serpentine cooling passage is at least partially defined in the second side rail.

13. The transition piece assembly as in claim 7, wherein the conduit extends across the outer surface of the transition duct and towards the upstream end of the transition duct within the cooling annulus.

14. A gas turbine, comprising:
   a. a compressor;
   b. a combustion section disposed downstream from the compressor, the combustion section including a combustor and an outer casing at least partially surrounding the combustor, the outer casing being in fluid communication with the compressor;
   c. a turbine disposed downstream from the combustion section; and
   d. wherein the combustor comprises:
      i. a fuel nozzle and an annular liner defining a combustion chamber defined downstream from the fuel nozzle;
      ii. a transition duct extending downstream from the combustion chamber, the transition duct having a downstream end terminating at an inlet to the turbine;
      iii. an outer sleeve extending circumferentially around the transition duct to define a cooling annulus there between; and
      iv. an aft frame integral with the downstream end of the transition duct and a forward edge of the outer sleeve, the aft frame having a main body defining a forward portion, an aft portion, an outer surface, an inlet port, an exhaust port in fluid communication with the cooling annulus, a serpentine cooling passage defined within the main body beneath the outer surface, wherein the serpentine cooling passage is in fluid communication with the inlet port and the exhaust port, and a conduit coupled to the exhaust port, wherein the conduit is a tube that extends across an outer surface of the transition duct within the cooling annulus, and wherein the conduit defines an outlet along the transition piece, and wherein the outlet is upstream relative to the exhaust port relative to a direction of a flow of combustion gases through the transition piece.

15. The gas turbine as in claim 14, wherein the serpentine cooling passage winds beneath the outer surface between the forward portion and the aft portion two or more times within the main body.

16. The gas turbine as in claim 14, wherein the aft frame main body further comprises an outer rail, an inner rail, a first side rail circumferentially separated from an opposing second side rail, wherein the serpentine cooling passage is at least partially defined one or more of the outer rail, the inner rail, the first side rail or the second side rail.

17. The gas turbine as in claim 14, wherein the conduit within the cooling annulus extends upstream of a fuel injector.

18. The gas turbine as in claim 14, wherein the conduit provides for fluid communication between the exhaust port and the combustion chamber.

19. The gas turbine as in claim 14, wherein the conduit includes two or more outlets providing fluid communication between the exhaust port and the cooling annulus.

20. The gas turbine as in claim 14, wherein the conduit extends toward the combustor to provide fluid communication between the exhaust port and the combustor.

* * * * *